2,964,557

METHOD FOR PREPARING SALTS OF SULFO-ALKYL METHACRYLATES

Warren D. Niederhauser, Huntsville, Ala., and Edward Broderick, Perkasie, and Franklin F. Owings, Philadelphia, Pa., assignors to Rohm & Haas Company, Philadelphia, Pa., a corporation of Delaware No Drawing. Filed Mar. 13, 1958, Ser. No. 721,085

9 Claims. (Cl. 260—486)

This invention deals with salts of sulfoalkyl methacrylates as new compositions of matter. It further relates to a method for the preparation of these salts of sulfoalkyl methacrylates. The present compounds may be represented by the formula

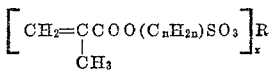

in which $n$ is an integer of 3 to 4, R is an alkali metal or alkaline earth metal and $x$ is an integer of 1 to 2 and represents the valence of the metal R. The symbol R typically represents sodium, potassium, lithium, calcium, barium, magnesium, and the like. Particularly useful are the alkali metal representations and especially sodium. When the integer $n$ is 3, the group it helps define is propylene, and when $n$ is 4, it defines the group butylene. The symbol $x$, of course, represents the valence of the symbol R and for instance, when R is sodium, $x$ is 1 and when R is calcium, $x$ is 2. Since the preferred representation of R is an alkali metal, the preferred value of $x$ is 1.

It is necessary to strictly adhere to the above definition of the compounds in this invention in order that the desired results are obtained. The present compounds are valuable solubilizers or hydrotropes in aqueous solutions to increase the solubility of a material that is otherwise sparingly soluble in water. For instance, in some liquid detergent concentrates, such as sodium dodecylbenzene sulfonate, the viscosity and turbidity of an aqueous 50% slurry are commercially disadvantageous. By adding 10% by weight of a compound of this invention to 40% of water and then incorporating 50% of sodium dodecylbenzene sulfonate, a slurry of satisfactory viscosity and no turbidity is obtained. At the same time, no adverse effects in detergency are incurred. Particularly effective in this respect is sulfopropylated sodium methacrylate. The compounds of this invention are especially valuable as monomers in preparing water-soluble strong polyelectrolytes and these are valuable in systems where the corresponding carboxylate types fail to perform in the desired manner. The polymers formed from the subject monomers having estimated molecular weights of 100,000 and above have been repeatedly found to be insensitive to hydrogen ions and metallic ions in aqueous solutions. From this it has been found that these polymers of low molecular weight are useful as dispersants in low pH systems and the corresponding higher molecular weight polymers are valuable as thickeners in low pH systems. A particularly useful application of these polymers is as dispersants in drilling muds. The insensitivity to metal salts and hydrogen ion of the polymers of this invention has been clearly established by tests in the presence of aqueous 10% solutions of magnesium chloride, calcium chloride, ferric chloride, aluminum chloride and copper sulfate. In all instances, these metal salts did not cause any precipitation of the polymer whereas the corresponding metal acrylate polymers give precipitates in all cases. The same surprising result was observed in other systems including aqueous 23% sodium chloride and 1.0 N hydrochloric acid. The above test evaluations were conducted in a standard manner employing 2 ml. of an aqueous 1% polymer added to 50 ml. of the concerned salt or acid solution. The above results, establishing the stability or insensitivity of the present polymers in the presence of hydrogen ion and metallic ions in aqueous systems, were surprising in the light of the known characteristics of the known compounds of somewhat similar structure.

The compounds of this invention are formed by reacting a selected methacrylic salt with a selected alkane sultone. Suitable as methacrylic reactants and illustrative thereof are sodium methacrylate, potassium methacrylate, lithium methacrylate, calcium methacrylate, barium methacrylate and magnesium methacrylate. The sultone reactants that may be employed are 1,3-propane sultone and 1,4-butane sultone. No other sultones may be employed in the present method. Furthermore, the corresponding acrylic salts are not satisfactory since the products formed therewith do not exhibit the same desirable properties, as stated heretofore.

The present reaction is conducted in the range of about 70° to 145° C., preferably 70° to 135° C. The reaction is preferably conducted at the reflux temperature of the reaction medium. While a solvent is not absolutely needed, it is usually advantageous to employ an inert volatile organic solvent such as benzene-denatured methanol, ethanol, butanol, benzene, toluene, xylene, and the like. The use of a solvent of the type just referred to insures an intimate mixture of the reactants and, as the reactant progresses, the product separates out. This facilitates the separation and the purification of the product and is, therefore, highly desirable. At the conclusion of the reaction, it is necessary merely to filter off the product and dry it by conventional methods.

The subject reaction progresses readily without the aid of a catalyst and substantially quantitative results are consistently obtained. The products of this invention, as well as the method for their preparation may be more readily understood from the following examples which are offered by way of illustration and not by way of limitation. Parts by weight are used throughout.

Example 1

There is added to a reaction vessel containing 200 parts of refluxing benzene-denatured ethanol, 10.8 parts of sodium methacrylate. Over a period over one-half hour, there is added 12.2 parts of 1,3-propane sultone, while the reaction mixture is kept at the reflux temperature. The reaction is continued for an additional six hours. During this time, it is observed that a white solid separates out from the reaction mixture. The ethanol is stripped off, yielding the product as the residue, a fine white powder which is identified as sulfopropylated sodium methacrylate. This product is polymerized using a redox system of potassium persulfate and sodium hydrosulfite to give a water-soluble polymer that has stability in the presence of solutions of aqueous 10% magnesium chloride, calcium chloride, ferric chloride, aluminum chloride, and copper sulfate. Similar stability is noticed in the presence of aqueous 23% sodium chloride and 1.0 N-hydrochloric acid.

In a similar manner, there are prepared from 1,4-butane sultone and calcium methacrylate, sulfobutylated calcium methacrylate.

Example 2

There are added to a reaction vessel 10.8 parts of sodium methacrylate and 200 parts of dry xylene. The mixture is heated to the reflux temperature and there is then added slowly 12.2 parts of 1,3-propane sultone. The reaction mixture is heated and stirred for eight additional hours. During the course of the reaction period, it is noticed that a white solid product settles out. The reaction mixture is filtered and the precipitate is washed twice with hot xylene. The precipitate is dried and is identified as sulfopropylated sodium methacrylate having the formula

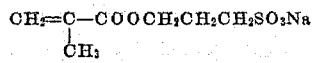

and having a sulfated ash of 30.5% (30.8% theoretical).

In like manner, there are produced sulfopropylated potassium methacrylate, sulfopropylated barium methacrylate, sulfopropylated magnesium methacrylate and sulfobutylated lithium methacrylate.

While it has been previously stated that the present products form polymers of noteworthy utility, it is also possible and often desirable to form copolymers of the present products with other ethylenically unsaturated copolymerizable compounds such as ethyl acrylate, sodium acrylate, sodium methacrylate, isopropyl acrylate, octyl methacrylate, acrylic acid, methacrylic acid, acrylonitrile, methacrylonitrile, acrylamide, methacrylamide, and the like.

We claim:

1. A method for the preparation of a compound having the formula

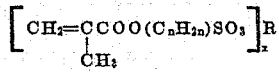

in which $n$ is an integer of 3 to 4, $x$ is an integer of 1 to 2, and R is a member of the class consisting of alkali metals and alkaline earth metals, which comprises reacting a member from the class consisting of alkali metal and alkaline earth methacrylates with a member from the class consisting of 1,3-propane sultone and 1,4-butane sultone at a temperature of about 70° to 145° C., said ($C_nH_{2n}$) group being a straight chain.

2. A method for the preparation of a compound having the formula

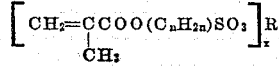

in which $n$ is an integer of 3 to 4, $x$ is an integer of 1 to 2, and R is a member of the class consisting of alkali metals and alkaline earth metals, which comprises reacting a member from the class consisting of alkali metal and alkaline earth methacrylates with a member from the class consisting of 1,3-propane sultone and 1,4-butane sultone at a temperature of about 70° to 135° C. and in the presence of an inert volatile organic solvent, said ($C_nH_{2n}$) group being a straight chain.

3. A method for the preparation of a compound having the formula

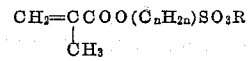

in which $n$ is an integer of 3 to 4, and R is an alkali metal, which comprises reacting an alkali metal methacrylate with a member from the class consisting of 1,3-propane sultone and 1,4-butane sultone at a temperature of about 70° to 135° C. and in the presence of an inert volatile organic solvent, said ($C_nH_{2n}$) group being a straight chain.

4. A method for the preparation of a compound having the formula

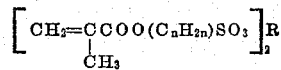

in which $n$ is an integer of 3 to 4, and R is an alkaline earth metal, which comprises reacting an alkaline earth metal methacrylate with a member from the class consisting of 1,3-propane sultone and 1,4-butane sultone at a temperature of about 70° to 135° C. and in the presence of an inert volatile organic solvent, said ($C_nH_{2n}$) group being a straight chain.

5. A method for the preparation of sulfopropylated sodium methacrylate which comprises reacting sodium methacrylate and 1,3-propane sultone at a temperature of about 70° to 135° C. and in the presence of an inert volatile organic solvent.

6. A method for the preparation of sulfobutylated calcium methacrylate which comprises reacting calcium methacrylate and 1,4-butane sultone at a temperature of about 70° to 135° C. and in the presence of an inert volatile organic solvent.

7. A method for the preparation of sulfopropylated potassium methacrylate which comprises reacting potassium methacrylate and 1,3-propane sultone at a temperature of about 70° to 135° C. and in the presence of an inert volatile organic solvent.

8. A method for the preparation of sulfopropylated barium methacrylate which comprises reacting barium methacrylate and 1,3-propane sultone at a temperature of about 70° to 135° C. and in the presence of an inert volatile organic solvent.

9. A method for the preparation of sulfopropylated magnesium methacrylate which comprises reacting magnesium methacrylate and 1,3-propane sultone at a temperature of about 70° to 135° C. and in the presence of an inert volatile organic solvent.

References Cited in the file of this patent

FOREIGN PATENTS 867,396    Germany _____ Feb. 16, 1953

OTHER REFERENCES

Helberger et al.: Ann. Chem. Justus Liebigs, 565, 22–35 (1949).